May 10, 1966  E. T. McENTIRE  3,250,976
METHOD AND STRUCTURE FOR VARYING ALTERNATING CURRENT
INDUCTION MOTOR ROTOR SPEED
Filed April 11, 1963  5 Sheets-Sheet 2

INVENTOR
ELDON T. McENTIRE
BY Herbert A. Minturn
ATTORNEY

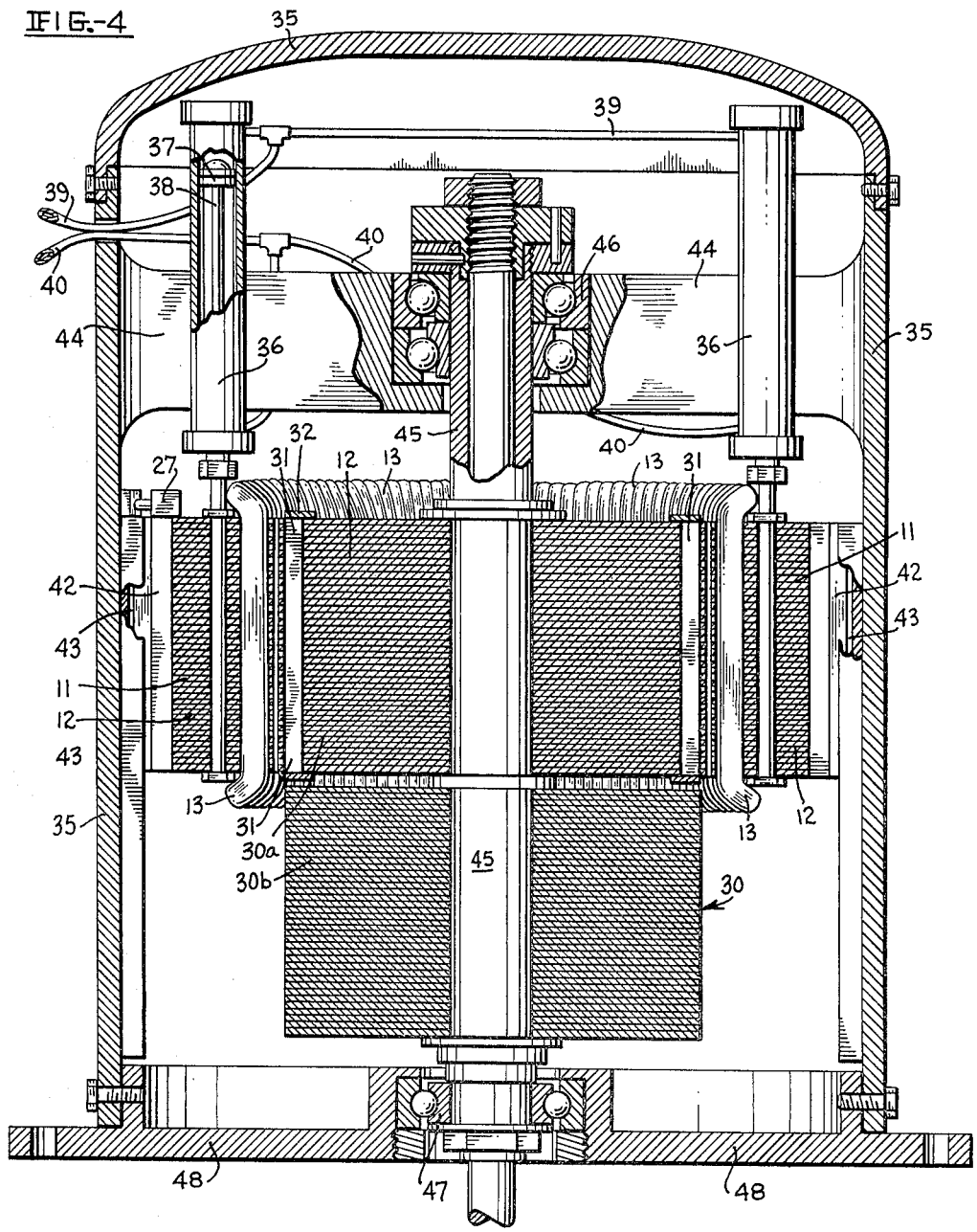

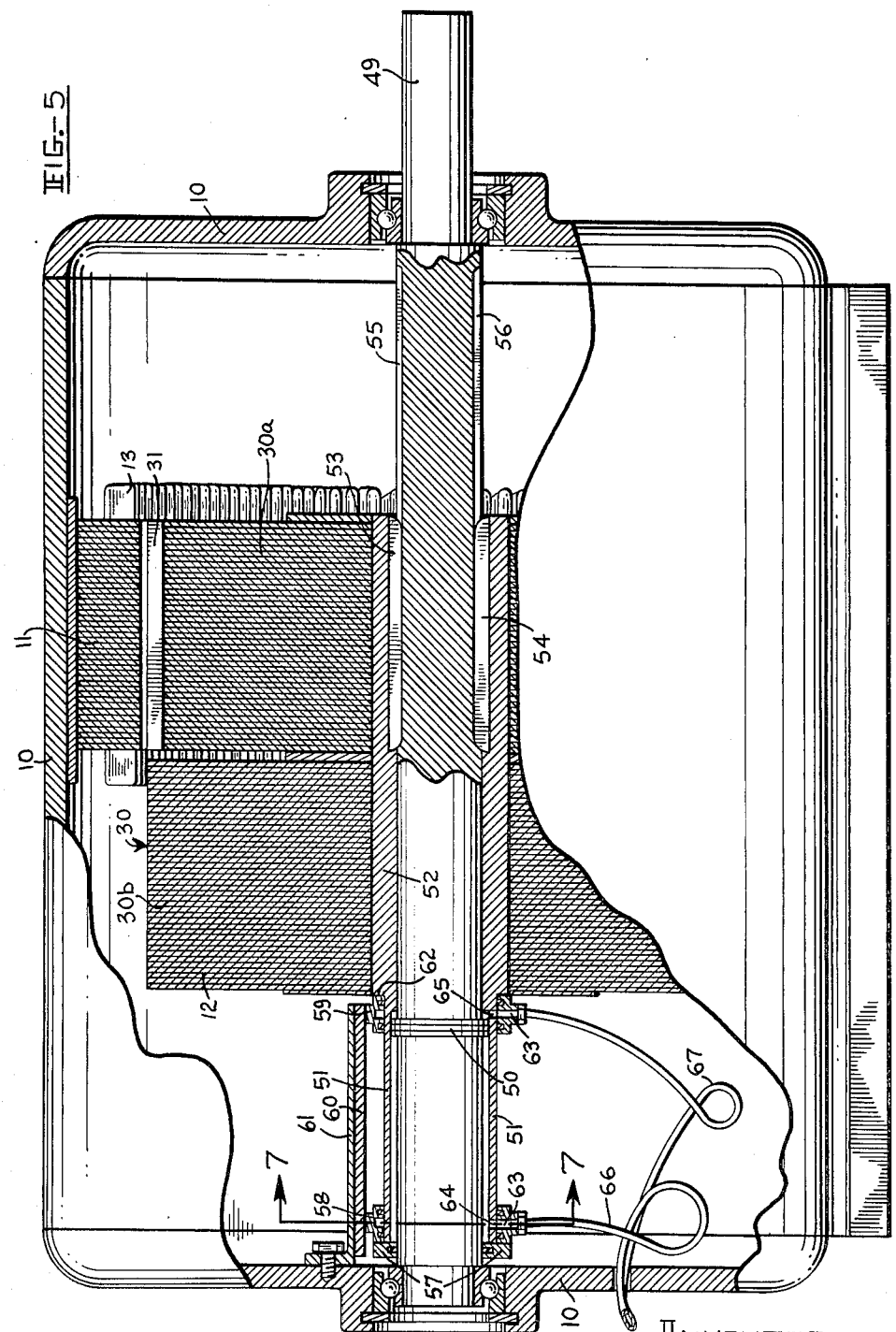

May 10, 1966  E. T. McENTIRE  3,250,976
METHOD AND STRUCTURE FOR VARYING ALTERNATING CURRENT
INDUCTION MOTOR ROTOR SPEED
Filed April 11, 1963  5 Sheets-Sheet 5
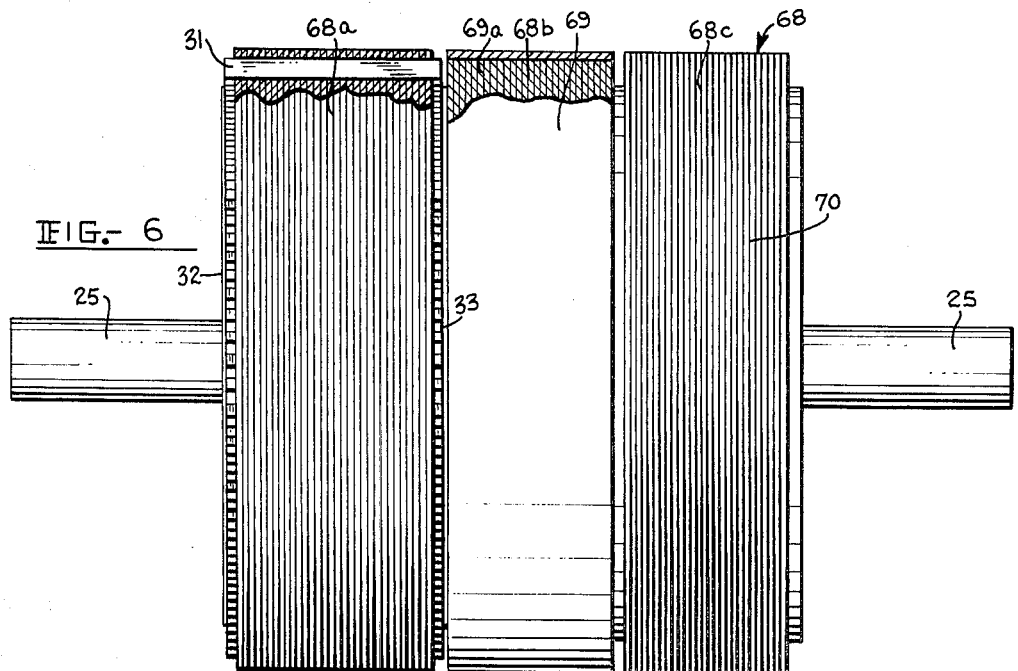
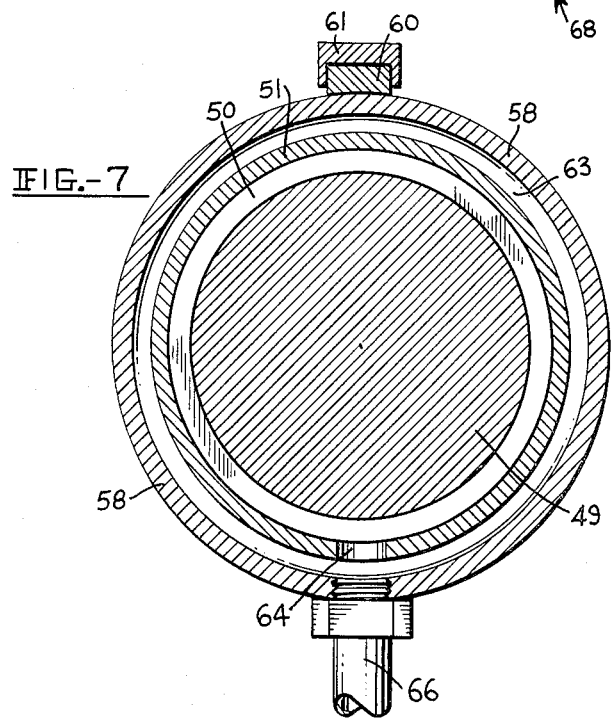
INVENTOR
ELDON T. McENTIRE
BY *Herbert Q. McEntire*
ATTORNEY

United States Patent Office 3,250,976
Patented May 10, 1966

3,250,976
METHOD AND STRUCTURE FOR VARYING ALTERNATING CURRENT INDUCTION MOTOR ROTOR SPEED
Eldon T. McEntire, 536 11th Ave.,
Salt Lake City 3, Utah
Filed Apr. 11, 1963, Ser. No. 272,368
4 Claims. (Cl. 318—243)

This invention relates to a method and to means for varying the rotor speed of a polyphase alternating current induction motor in the absence of the employment of clutches, introduction of resistances into rotor windings; rheostats; and the like as have heretofore been commonly used.

The invention fundamentally comprises maintaining a constant voltage on the stator windings and varying the induced voltage in the secondary windings of the rotor by relative axial movement of the stator and the rotor to vary the axial alignment one with the other.

A primary object of this invention is to provide an induction motor which can drive a load efficiently with high slip r.p.m. This invention provides efficient operation of the induction motor at speeds which may slip more than 50% below the synchronous speed of the motor.

The basic nature of the invention may be better stated in that the invention contemplates employing the secondary windings with its iron core and a secondary core which has no windings while the stator voltage remains at its full value, making this change between the core with windings and no windings at the rate of change of speed desired.

The invention and its objects and purposes will be better understood by those versed in the art in the following description of several forms of the invention as illustarted more or less diagrammatically in the accompanying drawings, in which:

FIG. 4 is a view in vertical section of a vertically disposed drive shaft motor;

FIG. 5 is a view in side elevation and partial section of a motor wherein the rotor is shifted horizontally on its drive shaft and the stator remains fixed;

FIG. 6 is a view of a modified rotor in partial section; and

FIG. 7 is a view in transverse section on a greatly enlarged scale on the line 7—7 in FIG. 5.

Figure 1:
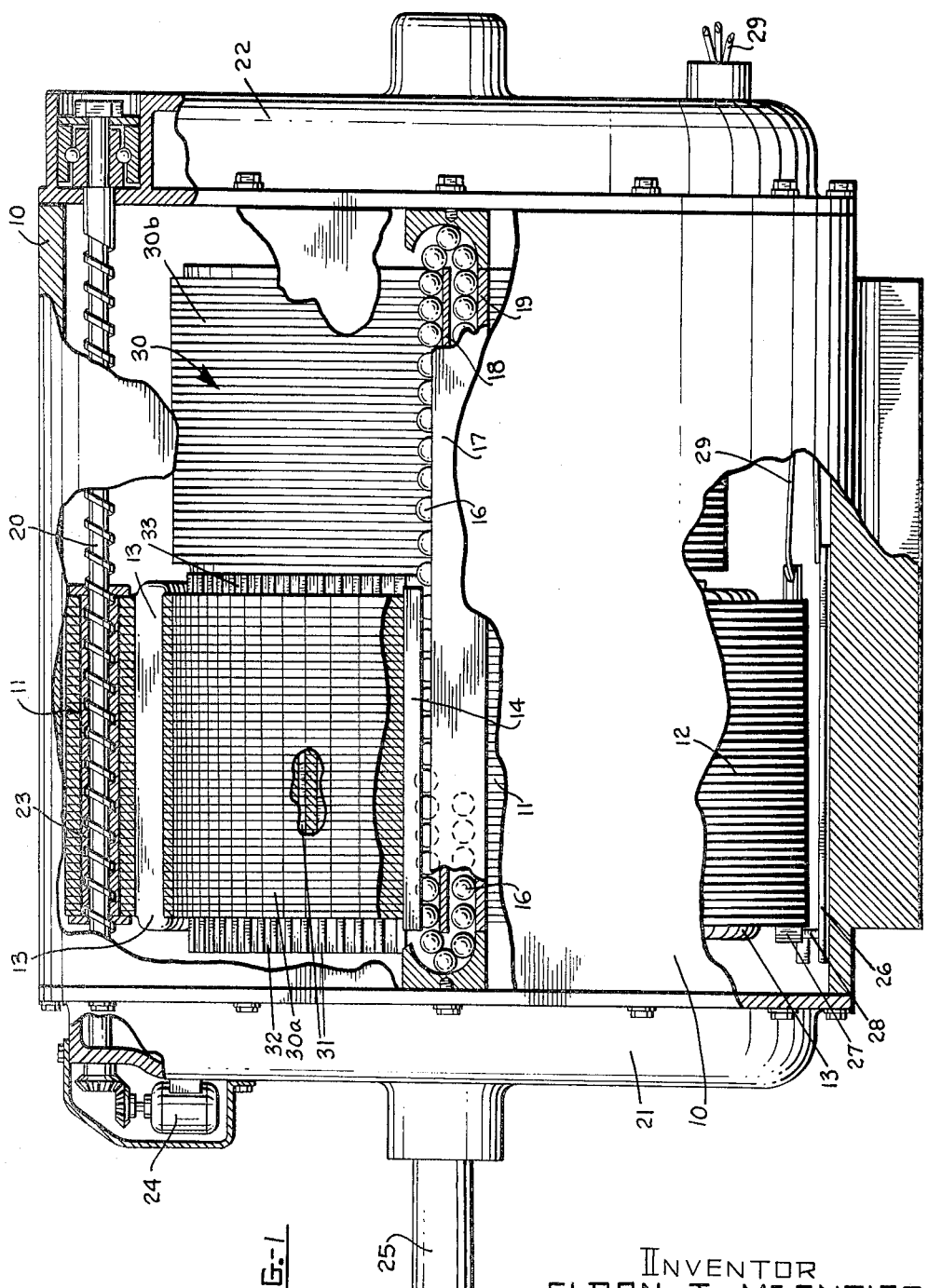
FIG. 1 is a view in side elevation in fragmentary and partial section form, of the invention wherein the drive shaft of the motor, that is the rotor shaft, is horizontally disposed.
Figure 2:
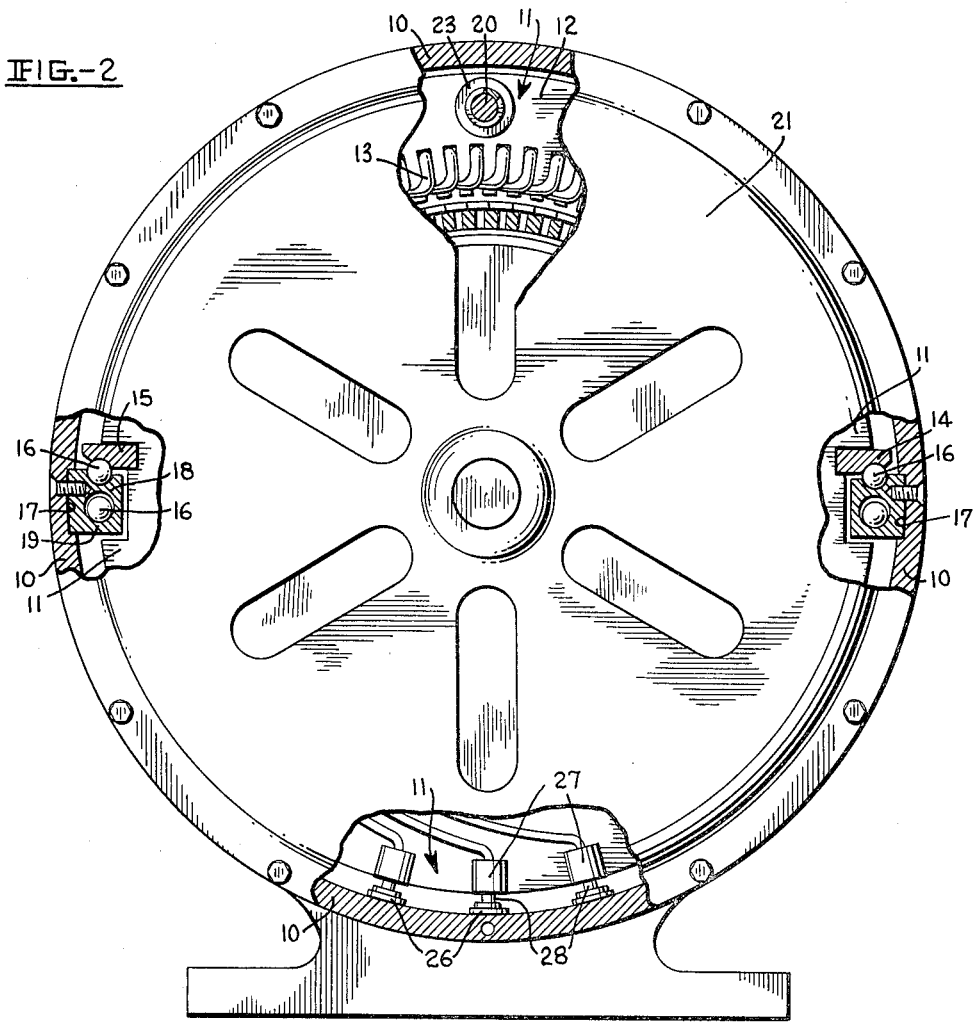
FIG. 2 is a view in end elevation of the motor with fragments of the structure removed.
Figure 3:
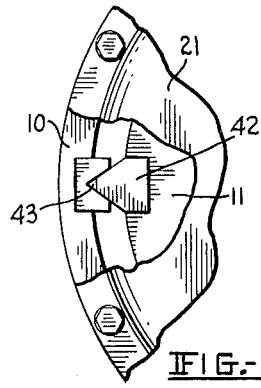
FIG. 3 is a detail in modified form of a stator guide and support.

Referring first to the form of the invention as illustrated in FIGS. 1–3, the motor frame 10 is elongated axially in comparison to the usual induction motor. Within this frame 10 is carried a stator 11 of more or less standard construction including a laminated core 12 with the usual windings 13.

The stator 11 is not fixed to the frame 10, but is mounted to be shifted axially of the frame. In the form shown in FIGS. 1 and 2, the stator 11 has side bars 14 and 15 fixed thereto and to extend longitudinally thereof. These bars rest in the one form upon a series of ball bearings 16 in each instance in turn supported by a track 17 which is fixed to the frame 10 as best illustrated in FIG. 2. The stator 11 will have an approximate maximum length of axial travel equal to its axial length to one side of the end position as shown in FIG. 1. In order to accommodate this travel, with a reasonable length of frame, the ball bearings 16 are made to be carried in a circulating manner by traveling over the topside of a track partition 18 under load of the stator and dropping down and returning freely over a carrier floor 19.

As illustrated in FIG. 1, this travel of the stator 11 is controlled by one or more lead screws 20 carried by opposite ends rotatively by the frame heads 21 and 22. The lead screw 20 screw-threadedly passes through a sleeve 23 extending through and fixed to the laminations 12 of the stator 11. By rotating the screw 20, the stator 11 is thus shifed along the side supporting bearings 16. Any number of these lead screws 20 may be employed, but one only is herein shown in order to avoid confusion in illustarting the invention. In any event, the lead screw 20 would be preferably driven by a small electric motor 24, the operation of which would be controlled by some suitable servo-motor (not shown) operating in conjunction with the speed desired of the motor shaft 25. In order to maintain an electrical circuit between the outside source of the polyphase current and the windings of the stator, during the shifting of the stator, a plurality of conducting bars 26, herein shown as three in number for a three phase circuit, are fixed to the inside of the frame 10 to extend longitudinally thereof. Brush carries 27 are fixed to and insulated from the stator 11, having brushes 28 elastically urged against the bars 26, one brush for each bar. The bars are of course insulated from the frame 10, and suitable leads 29 are carried from the bars externally of the motor for connection into the power circuit.

A support for the stator 11, praticularly in small motors may be employed such as is indicated in FIG. 3, wherein the stator 11 carries a bar 42 having a V shape received into a V slot 43 fixed to the frame 10. There would of course be one of these supports at least on opposite sides of the inside of the frame 10.

The rotor generally designated by the numeral 30 in the form herein shown is of the squirrel-cage type, and approximately half of the length of the rotor is provided with transverse bars 31 carried across the rotor in the normal practice, the ends of these bars being fixed to heavy circular short-circuiting rings 32 and 33 respectively. This part of the rotor designated by the numeral 30a has a laminated iron core. The other length of the rotor 30 designated by the numeral 30b is simply an iron laminated core without any windings, either of the bar type or of wire. This length is substantially equal to the axial length of the stator 11. Both rotor sections 30a and 30b are fixed one to the other as well as being fixed to the drive shaft 25 all in the usual and well known manner.

The external diameter of the rotor section 30b is substantially equal to the external diameter of the section 30a. The position of the stator 11 as shown in FIG. 1 is a normal, maximum speed drive position where the stator is receiving the wound portion of the rotor 30a in full axial alignment therewithin. If the speed of the rotor 30 is desired to be reduced, the screw 20 is operated to shift the stator 11 to the right as viewed in FIG. 1 where it will come over the stator section 30b, removing the full width of encirclement of the stator about the section 30a. In so doing, the amount of current induced in the section 30a in the bars 32 thereof will be diminished, and since there are no windings or bars across the section 30b, there will be very little or no secondary current induced therein with a tendency to drive the rotor 30. When the stator 11 is shifted to its limit to the right to have its width fully surrounding the length of the section 30b, the torque at the shaft 25 will be so low as to be practically non-existent so that it will not drive the ordinary load to which it is connected.

For starting purposes, the stator will be in the position where it is encircling the rotor section 30b, and then the stator will be smoothly shifted to the left to bring it over the section 30a gradually until the desired speed of the rotor 30 is attained, and the applied load is taken up.

That is the method of varying the amount of induced current in the secondary from the primary of the stator all without varying the stator voltage.

The same principle of the invention is illustrated in the structure of FIG. 4 where it is applied to a vertically disposed motor such as would be the motor position for driving deep well pumps, or other devices requiring a vertically disposed drive shaft. In this form of FIG. 4, the stator 11 is vertically shiftable within the frame 35. While the same shifting means such as the screw 20 in FIG. 1 may be employed in multiple applications, the shifting means as applied to the structure in FIG. 4 comprises a plurality of hydraulic cylinders 36, herein shown as only two in number for the sake of clarity in illustrating. The cylinders 36 each carry a piston 37 from which a rod 38 leads downwardly to pass entirely through the stack of laminations 12 of the stator, and be secured thereto. By means of suitable hydraulic lines 39 and 40, fluid is selectively admitted into the cylinders 36 at opposite ends thereof for selective pressurizing the cylinder on either side of the piston 37. In the position of the stator, shown in FIG. 4, these pistons 37 will be near the top of their cylinders 36, with pressure being maintained by the pipe line 40 under the pistons within the cylinders 36. When the stator 11 is to be lowered from its normal full power driving position which is in the uppermost position, the pressure in the line 40 is reduced to allow the pistons to descend, and fluid is taken onto the top side of the pistons through the pipe 39. In the structure as illustrated in FIG. 4, the stator is guided on its vertical travel by the guide structure shown in FIG. 3. The cylinders 36 are fixed to the frame 35 relative to travel of the stator 11. In the form herein shown, these cylinders 36 are carried by a frame cross member 44.

A rotor substantially the same as that illustrated in FIG. 1 and described in relation thereto, designated by the same numeral 30, is fixed to a hollow shaft 45 which is suspended from a bearing 46 carried by the member 44, and passes through a lower guide bearing 47 which is mounted in the base 48 in turn carrying the frame 35. This rotor 30 carries the same sections 30a and 30b. The operation of the motor shown in FIG. 4 as to the varying of the induced current in the section 30a is identical with that as described in regard to FIG. 1.

Referring to FIG. 5, the rotor 30 is herein shown as being the shiftable unit whereas the stator 11 remains stationary and fixed to the motor frame 10. In other words the rotor may shift along its driving shaft 49 relative to the stator, instead of the stator shifting along the rotor. The same result is obtained, since in any event, whether the stator shifts and the rotor remains axially stationary or the stator remains fixed and the rotor shifts gives the same end results in respect to the induced or non-induced current in the secondary winding.

In FIG. 5, one particular form of a structure for shifting the shaft 49 is illustrated. The shaft 49 carries an annular ring 50 therearound in the nature of a piston, and slides within a tubular extension 51 of the rotor carrying sleeve 52. The sleeve 52 slidingly bears on the shaft 49. It may slide axially, but by means of splines or keys 53 and 54, the sleeve 52 is rotatively driven by the shaft 49 although it is free to shift axially therealong, these members 53 and 54 riding in the keyways 55 and 56 respectively. A head 57 is fixed on the end of the tube 51. A pair of rings 58 and 59 slidably fit around the outside of the tube 51, and are fixed to a bar 60 in turn slidably fitted within the underside of an arm 61.

As indicated in FIG. 5, these rings 58 and 59 are positioned at the extreme ends of the tube 51 adjacent respectively to the head 57 and to a shoulder 62 from which the tube 51 extends. Each of these rings 58 and 59 is provided with an annular passageway 63 entirely therearound. The tube 51 is provided with at least one port 64 aligned with the passageway 63 of the ring 58 and a port 65 aligned with the passageway 63 of the ring 59. The tube 51 revolves within the rings 58 and 59 which are held stationary in respect to turning with the tube 51 and the shaft 49.

The rings 58 and 59 are provided respectively with fluid carrying lines 66 and 67 respectively so that fluid pressure conducted by these lines may be applied selectively to either side of the piston 50.

The rotor 30, FIG. 5, is shown as having been shifted to its position wherein the maximum current may be induced in the secondary section 30a. This position is maintained by pressure being applied to the line 66 into a space between the tube 51 and the shaft 49 to the left hand side, as viewed in FIG. 5, of the piston 50. To shift the rotor 30 to bring the non-wound section 30b within the stationary stator 11, the pressure in the conductor 66 is relieved, and pressure is applied through the conductor 67 to the right hand side of the piston, driving the rotor and its mounting sleeve 52 to the right. The rings 58 and 59 travel with the tube 51 in its axial movement but not circumferentially therearound, by reason of the bar 60 being mounted to slide along the fixed arm 61. Obviously the positioning of the rotor along the shaft 49 may be controlled gradually or changed abruptly by the application of pressure selectively in the conductors 66 and 67.

Referring to FIG. 6, a modified form of rotor designated generally by the numeral 68 is illustrated to be in three axial lengths namely the length 68a; length 68b; and length 68c. The length 68a corresponds in all major respects to the length 30a of the rotor shown in FIGS. 1, 4 and 5, wherein the rotor has the conducting bars 31 short-circuited by the circular heavy rings 32 and 33. The intermediate length 68b is a simple stack of laminations one pressed against the other and these laminations are encircled by a band of copper 69, this copper being intimately pressed or secured against the periphery of these laminations, the laminations being designated by the numeral 69a. Then the third length of the rotor, 68c, is simply a stack of side by side laminations 70 pressed one against the other without any windings whatsoever. In this form of rotor, which would replace the rotor 30, when the stator 11 is relatively shifted axially along the rotor 68, shifting from the maximum secondary induced current position which would be when the rotor section 68a is telescoped by the stator 11, and it is desired to reduce speed, the rotor would be shifted to come initially in part over the section 68b wherein there is no short-circuiting of current to induce a repulsive effect, but to the contrary, eddy currents will be set up in the copper layer 69, offering a repulsive force at high slip to continue driving the shaft 25 with the torque required by the load at the desired reduced speed. The stator may be further shifted partly over the rotor section 68c. The speed of rotation will decrease and the effective ampere turns in the eddy current cylinder required to drive the load will be generated at slower speed to overcome the torque of the load. Thus a new electrical balance is established. The placing of the eddy current cylinder 69 and the laminations 69b as an intermediate between sections 68a and 68c will achieve a more gradual and controllable change in the speed of the shaft 25. Any other electrical material other than iron may be substituted for the copper.

A wound rotor slip ring induction motor is designated with secondary windings in the rotor to be connected to insulated slip rings on the motor shaft and commutator brushes are provided to set up electrical connections to short-circuit the secondary windings in the rotor. So far that description would apply to any constant speed induction motor. However, if resistors are connected to the terminals of the secondary windings, a back E.M.F. is developed through the resistors which will oppose the E.M.F. induced in the secondary windings in the rotor. This back E.M.F. is effective in reducing the speed of the motor, but considerable power is wasted in these resistors. This is generally known as slip horsepower loss.

Sometimes the speed of the induction motor is attempted to be reduced by a magnetic eddy current slip coupling or a fluid coupling as above indicated between the motor and the load. It can be shown that the horsepower loss is equal to the torque of the load times the slip r.p.m. Under certain operating conditions this slip horsepower loss may be more than the horsepower required to drive the load.

One of the purposes of the present invention is to avoid such a loss, and, following the present invention teachings, a variable speed alternating current induction motor will operate efficiently at speeds which may slip more than 50% below the synchronous speed of the motor.

Following the teaching of the present invention, the voltage induced in the secondary windings in the rotor is reduced and the motor will operate at a slower speed in the relative telescopic shifting of the stator and the rotor. No back E.M.F. is required to reduce the speed and therefore, no power is lost in the resistor banks. When the rotor windings and the stator windings are opposite each other the rotor will rotate about 2% below the synchronous speed of the motor. When the stator with its windings is opposite the rotor section which has iron laminations without windings, the motor will operate at a slower speed according to the torque required by the load. No rotation will occur if torque developed by the motor is less than the torque required by the load. As the stator with its windings is gradually moved inside the motor frame in an axial direction toward the rotor section which has windings, the voltage induced in the secondary windings will increase. When the secondary windings are short-circuited as in a squirrel-cage induction motor or also in a wound rotor with slip rings which is short-circuited through the brushes, the electric current in the secondary windings will increase. This will increase the torque developed by the motor and also increase its speed.

The use of the copper clad intermediate section 68b of the rotor shown in FIG. 6, supplies an intermediate range of induced voltage as between the highest voltage and substantially no voltage in the rotor. The eddy current section 68b serves as a secondary winding which has quite low induction, and will have an even lower inductance when the iron of the stator is moved beyond it.

Since the illustration of the invention is shown more or less diagrammatically in the drawings as above indicated, no attempt has been made to show ventilation means of the windings; lubrication of the various parts, nor an illustration of the wound rotor with the slip rings for shorting. These are all well known expedients to those versed in the art. The squirrel-cage type of rotor is shown as being a simpler illustration.

One particular demand for this type of a motor constituting invention was to provide means for maintaining a substantially constant pressure in watermains where the pumping system is directly connected to the mains in the absence of storage or pressure tanks and the like. Demand for water in the mains will vary from time to time, and in the absence of any means to correct the pressure rising and falling with these demands, the pump motor necessarily should increase and decrease in speed to give the most efficient operation.

As has been indicated, the term "wound" rotor is employed to include both the short-circuiting bars and rings of the squirrel-cage type as well as of the wire wound type rotor shorted through slip rings and brushes. All rotor laminations are iron throughout all axial sections of the rotor.

Therefore while I have described my invention in the several forms, in more or less minute detail, it is obvious that structural changes may be employed in the building of a motor incorporating the invention without departing from the spirit of the invention, and accordingly I do not desire to be limited to the precise forms which have been employed as illustrations beyond any limitations which may be imposed by the following claims.

I claim:

1. For varying the speed of an alterating current induction motor, the combination with a motor stator primary and a rotor secondary; of two bodies of laminated iron carried by the rotor; one of said bodies carrying said secondary and the other body being free of conductors; and a metal band encircling said other body providing a rotor part of lower inductance than that of the secondary body when the other body is within the magnetic field of the primary.

2. The combination in an alternating current induction motor of a primary and secondary within a motor frame, and a rotor carrying the secondary; of means axially shifting said primary relatively along the rotor to and from said secondary to vary the voltage induced in the secondary for variable speed of the rotor; said rotor including a laminated iron length free of conductors and adjacent an end of said secondary; a metal band encircling said length; said banded length being selectively encircled by said primary by said axial shifting means; and an additional rotor length of laminated iron adjoining the banded length and around which said primary may be shifted.

3. For varying the speed of an alternating current induction motor, the combination with a motor stator primary and a rotor secondary; of two bodies of laminated iron carried by the rotor; one of said bodies carrying said secondary; the other body being free of conductors; a metal band encircling said other body providing a rotor part of lower inductance than that of the secondary body when said other body is within the magnetic field of the primary; and a third rotor body adjacent said band encircled body and being laminated iron free of conductors providing a rotor body length of still lower inductance than that of said other body when within the primary magnetic field; and means shifting the primary selectively across said bodies.

4. In a variable speed alternating current induction motor, the combination with a motor frame; a primary carried by the frame; a rotor shaft rotatably carried axially of the primary and held against longitudinal travel; a sleeve surrounding a portion of the shaft rotatably fixed to and longitudinally shiftable along the shaft; a secondary carried by the sleeve; a tubular portion of said sleeve defining an annular space between it and the shaft; sealing means closing said space at ends thereof; a member fixed to and around the shaft within said space serving as a piston therein; and means conducting pressurized fluid into said space selectively to opposite sides of said piston member to shift longitudinally said sleeve and the secondary thereon relative to said primary.

References Cited by the Examiner

UNITED STATES PATENTS

| | | | |
|---|---|---|---|
| 471,155 | 3/1892 | Thompson | 310—211 X |
| 2,748,334 | 5/1956 | Miller | 318—243 |
| 2,842,729 | 7/1958 | Hillman | 318—220 |
| 2,914,939 | 12/1959 | Thillaimuthu | 73—136 |
| 2,915,254 | 12/1959 | Weber et al. | 242—45 |
| 2,993,391 | 7/1961 | Raney | 77—33.5 |
| 3,054,569 | 9/1962 | Weber et al. | 242—45 |

MILTON O. HIRSHFIELD, *Primary Examiner.*

ORIS L. RADER, *Examiner.*

D. F. DUGGAN, *Assistant Examiner.*